(12) United States Patent
Ding

(10) Patent No.: US 8,079,383 B2
(45) Date of Patent: Dec. 20, 2011

(54) CONTROLLER GAIN SCHEDULING FOR MASS FLOW CONTROLLERS

(75) Inventor: Junhua Ding, Tewksbury, MA (US)

(73) Assignee: MKS Instruments, Inc., Andover, MA (US)

( * ) Notice: Subject to any disclaimer, the term of this patent is extended or adjusted under 35 U.S.C. 154(b) by 499 days.

(21) Appl. No.: 11/635,726

(22) Filed: Dec. 7, 2006

(65) Prior Publication Data

US 2008/0140260 A1 Jun. 12, 2008

(51) Int. Cl.
*G05D 7/06* (2006.01)
(52) U.S. Cl. .................. 137/487.5; 700/282
(58) Field of Classification Search ........... 137/487.5; 700/282
See application file for complete search history.

(56) References Cited

U.S. PATENT DOCUMENTS

| | | | |
|---|---|---|---|
| 6,272,401 B1* | 8/2001 | Boger et al. ............... | 700/282 |
| 6,445,980 B1* | 9/2002 | Vyers ....................... | 700/282 |
| 6,712,084 B2 | 3/2004 | Shajii et al. | |
| 6,962,164 B2 | 11/2005 | Lull et al. | |
| 2002/0198668 A1 | 12/2002 | Lull et al. | |
| 2005/0278074 A1* | 12/2005 | Junk et al. ................. | 700/282 |
| 2007/0276545 A1* | 11/2007 | Smirnov ................... | 700/282 |
| 2008/0099069 A1* | 5/2008 | Cook ........................ | 137/14 |
| 2008/0140260 A1* | 6/2008 | Ding ........................ | 700/282 |

FOREIGN PATENT DOCUMENTS

| | | |
|---|---|---|
| JP | 59170912 | 9/1984 |
| JP | 63174110 | 7/1988 |
| JP | 02304604 | 12/1990 |
| JP | 08263144 | 10/1996 |

OTHER PUBLICATIONS

International Search Report for corresponding PCT Application No. PCT/US2007/073328. 3 PP.
Written Opinion for corresponding PCT Application No. PCT/US2007/073328, 7PP.
Office Action dated Jan. 31, 2011 from corresponding Chinese Application No. 200780044834.0.

* cited by examiner

*Primary Examiner* — Stephen M Hepperle
*Assistant Examiner* — William McCalister
(74) *Attorney, Agent, or Firm* — McDermott Will & Emery LLP

(57) ABSTRACT

A mass flow controller having a feedback controller gain, comprises: a sensor configured so as to sense the flow of fluid through controller; a valve arranged so as to adjust the flow of fluid through the controller; and a processor configured so as to control the valve as a function of the flow of fluid sensed by the sensor. The sensor and valve are arranged within a feedback system, and the processor updates the feedback controller gain in real time based on the ratio of at least one calibration gas parameter to at least one operating gas parameter, such that the closed loop transfer function of the feedback system remains substantially constant regardless of operating conditions so as to have a consistent control performance at different operation conditions from the calibration condition.

3 Claims, 4 Drawing Sheets

CONTROLLER GAIN SCHEDULING FOR MASS FLOW CONTROLLERS

BACKGROUND

1. Field

The present disclosed embodiments relate generally to measurement and control of fluid flow, and more specifically to model-based controller gain scheduling for mass flow controllers.

2. Background

A mass flow controller (MFC) is a device that sets, measures, and controls the rate and amount of fluid, such as a gas or vapor, passing through the device. These devices are designed and calibrated to control with high precision the flow of gas within a predefined range of flow rates.

Some manufacturing processes, such as semiconductor manufacturing, require precise control of the rate of flow and the amount (mass) of gases and vapors delivered to a process chamber or tool. Often, precise fluid flow rates and amounts (the total mass of fluid) are critical to ensure optimal results. Applications include metering of precise amounts of gases and vapors flowing into a process chamber for subsequent deposition on work pieces, dry etching to remove material, ion and plasma beams used in the semiconductor and pharmaceutical industries, etc. Mass flow controllers are particularly suited for these and other tasks.

Referring to FIG. 1, a mass flow controller system 10 typically couples a mass flow controller 12 with a flow channel 14. A select fluid enters the channel through an inlet 16, passes through the controller 12 and leaves the controller through an outlet 18 in a precisely controlled manner. The fluid flow path 20 splits inside the controller 12 into a bypass path and a sensor path. Specifically, at the first, divergence juncture 22, a fraction of the fluid splits off from the main path 20 and is divided between the main bypass path of a bypass tube 26, and a sensor path of the capillary sensor tube 24 of sensor 40. The sensor tube 24 and bypass tube 26 are rejoined at a second, convergence juncture 28 located downstream from the first juncture 22. This second junction 28 recombines the fluid flowing through the paths of the sensor and bypass tubes 24 and 26. The recombined fluid 30 then passes through a control valve 50, which in turn controls the fluid flow, as indicated at 36 as it exits the controller 12 through the outlet 18. A laminar flow or flow splitter element 32 is usually disposed in bypass tube 26 between the first and second junctures 22 and 28 so as to create laminar flow through the bypass tube 26 between the two junctures. As a result of laminar flow through the bypass tube and the internal capillary dimensions of the capillary tube, the mass flow through the capillary and bypass tubes will remain at a precise bypass ratio throughout the pre-designed rate of flow range of the instrument.

The sensor 40 is designed to provide a signal representative of the rate of flow of fluid flowing through the sensor tube 24. Since the bypass ratio remains fixed throughout the pre-designed rate of flow range of the instrument, the signal provided by the sensor 40 is representative of the combined flow through both the bypass and sensor tubes 24 and 26 (i.e., the combined flow through the mass flow controller system 10). The signal output of the sensor 40 is applied to the processor 60.

Sensors are known for measuring flow based on temperature measurements, while others are known for measuring flow based on pressure measurements. A typical thermal-based sensor has two sensor coils 44, 46, the upstream coil for injecting heat into the gas or vapor flowing through the capillary tube, and the other downstream for measuring the temperature loss between the two coils. This temperature difference is representative of the flow rate. Other thermal sensor arrangements are known, including sensors employing one and three coils.

The controller 12 also includes a control valve 50 used to control the fluid flowing response to a signal from the processor 60. The latter is configured and arranged so as to compare the actual flow as sensed by the sensor 40 to a set point (SP) value, usually determined by the user and/or the process being controlled, and provide a signal to the valve 50 so as to set the valve 50 at a correct position so as to produce the desired flow established by the SP value. Thus, if the processor 60 detects, from the sensors 40, that fluid is flowing too quickly, the processor 60 would send a signal to the control valve 50 to decrease the fluid flow rate, and vice versa.

The processor 60 may be configured so as to control the valve in at least two valve designs. One valve design includes a normally-open valve wherein the valve remains open until an electric signal is sent to the control valve. Another design is the normally-closed valve design wherein the valve is closed until an electric signal is sent to the control valve.

Mass flow controllers have also been designed to be insensitive to pressure fluctuations upstream from the controllers. An example of a pressure insensitive mass flow controller ($\pi$MFC or piMFC) is described in U.S. Pat. No. 6,712,084 issued to Ali Shajii, et al, and assigned to the present assignee. The patented $\pi$MFC also includes a thermal-based flow sensor, and is similar to the MFC described thus far in connection with FIG. 1, and further includes a pressure sensor 70 (shown by dotted lines in FIG. 1) coupled to measure the pressure of the fluid upstream from the valve 50. The pressure sensor 70 provides a signal to the processor 60 representative of the measured pressure of the fluid flowing through the device. Pressure insensitivity control is achieved in the patented $\pi$MFC through coordinated operations among the sensor 40, the processor 60, and the control valve 50, as well as using pressure measurements made by the pressure sensor 70. The goal of the patented $\pi$MFC is for the output flow 36 to be insensitive to upstream or downstream pressure disturbances. Algorithms (processed in the processor 60) are used to control the control valve 50 based on sensor inputs as well as the upstream pressure measurements. The $\pi$MFC further includes a temperature sensor 80 attached to the flow body for measuring the temperature of the fluid flowing into the controller.

In operation, the MFC controls the openness of the valve via feedback control loop such that the output flow rate, $Q_r$, tracks the flow set point, SP. The controller gain of the MFC is usually determined at a known calibration condition, e.g. 40 psia inlet Nitrogen gas at room temperature, to have a good control performance when the flow set point changes. Two common control performance issues often occur for a MFC operating in a condition different from the calibration condition such as different gas type, different inlet gas pressure, or different inlet gas temperature. The first common control performance issue is overshoot when the set point changes as shown in FIG. 2A. This issue is related to a low controller gain setting when the inlet gas is switched from Nitrogen to a light weight gas such as Helium or the inlet gas pressure changes from high pressure to low pressure. The second common control performance issue is oscillation when the set point changes as shown in FIG. 2B. This issue is related to a high controller gain setting when the inlet gas is switched from Nitrogen to a heavy weight gas such as SF6 or the inlet gas pressure changes from low pressure to high pressure. These control issues are highly problematic in semiconductor manufacturing processes that require careful, high precision, time control of fluid flow rates One approach to overcome this problem of differing responses depending on the pressure and type of gas flowing through an MFC is discussed in U.S. Pat. No. 6,962,164 issued to Lull. Lull tries to overcome the control issues by empirically determining a valve gain term based on a change of fluid flow divided by a corresponding change in valve displacement (of the valve used in the thermal-based MFC) at a plurality of predetermined flow rates. In other words, defining the gain setting as an operation-dependent function by correlating fluid flow with valve displacement. Using predetermined flow rates, Lull deduces the appropriate flow rate for a given condition (i.e., valve displacement) and adjusts the gain of the instrument appropriately. It is thought that by using data from different predetermined flow rates, the valve gain term would be more accurate. However, this approach is unnecessarily complicated.

There is therefore a need in the art for MFCs that can provide more reliable control of fluid flow in which the actual flow more smoothly settles on the set point without either overshoot or oscillation control responses.

SUMMARY

A mass flow controller having a feedback controller gain, comprises: a sensor configured so as to sense the flow of fluid through controller; a valve arranged so as to adjust the flow of fluid through the controller; and a processor configured so as to control the valve as a function of the flow of fluid sensed by the sensor. The sensor and valve are arranged within a feedback system, and the processor updates the feedback controller gain in real time based on the ratio of at least one calibration gas parameter to at least one operating gas parameter, such that the closed loop transfer function of the feedback system remains substantially constant regardless of operating conditions so as to have a consistent control performance at different operation conditions from the calibration condition.

DETAILED DESCRIPTION

Figure 3:
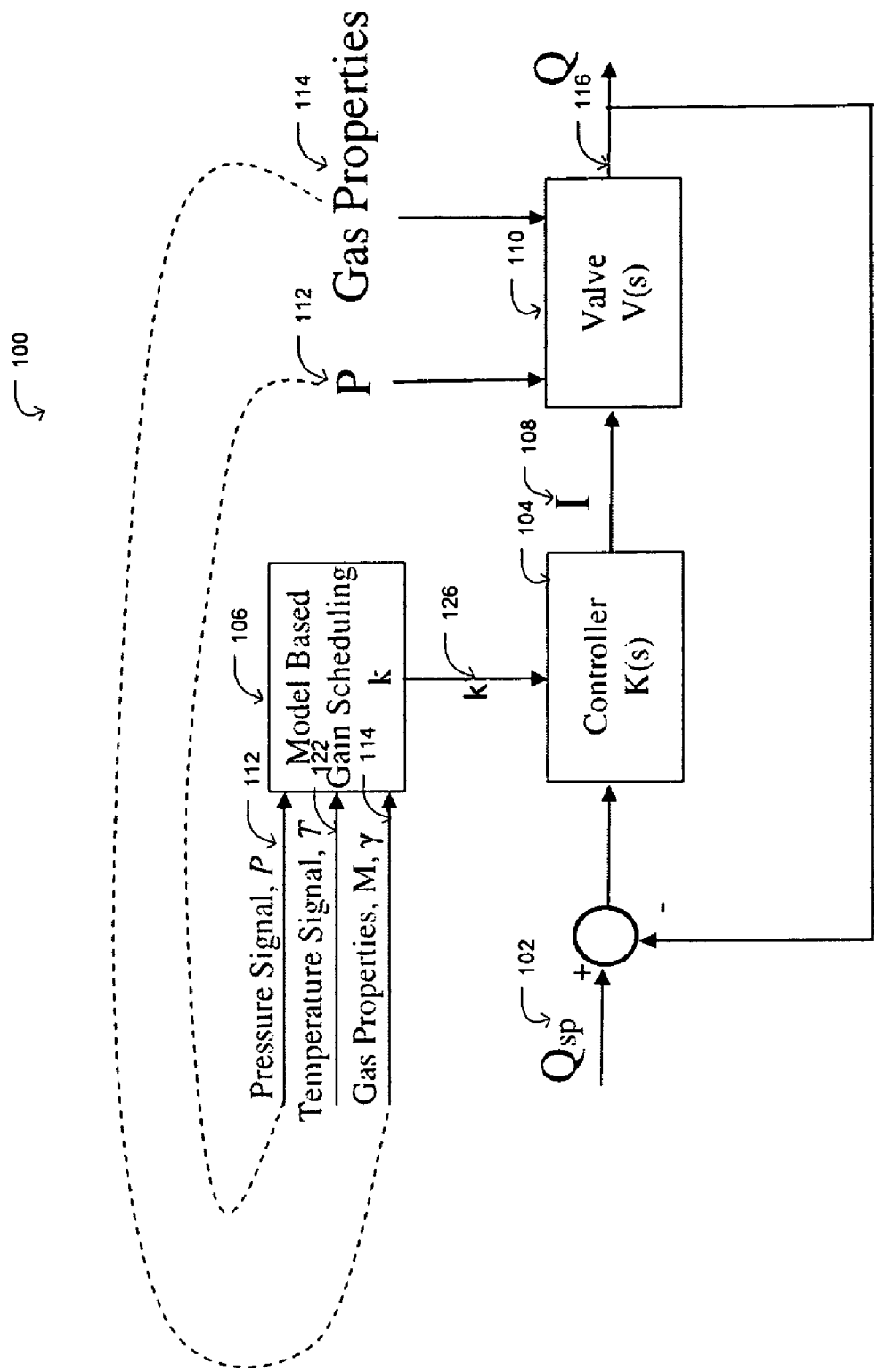
FIG. 3 is a block diagram of the controller gain scheduling method for MFCs.

Referring to an embodiment shown in FIG. 3, the block diagram of a MFC control system 100 includes a negative feedback control loop. Feedback control systems generally include an input and an output, and a relationship that couples the output with the input. In this feedback control loop, $Q_{sp}$ 102 (the desired set point flow rate) is the input. A resulting actual rate of flow Q, indicated at 116 is the output. In the following description, all time domain variables such as Q(t) and $Q_{sp}(t)$ are transformed to LaPlace domain as Q(s) and $Q_{sp}(s)$ which is a common practice used in control area.

The physical model of the control system 100 includes a controller K(s), indicated at 104, and a valve V(s), indicated at 110. The feedback controller K(s) generates a control command current I(s), indicated at 108 so as to adjust the openness of the valve such that the output of the valve, the actual flow rate Q(s), tracks the desired set point flow rate $Q_{sp}(s)$ 102. Here, we assume that the flow sensor provides fast and accurate measurement such that the dynamics of flow sensor can be ignored compared with the dynamics of valve. If the dynamics of the flow sensor can not be ignored, one can combine the dynamics of flow sensor with the dynamics of valve as a whole valve dynamic model V(s).

The valve 110 can be described by a valve transfer function as:

$$V(s) = \frac{Q(s)}{I(s)} = k_v(M, \gamma, T, P) \cdot F(s) \quad (1)$$

where $k_v(M,\gamma,T,P)$ is the valve gain function which is dependent on the operation conditions such as the molecular weight of the inlet gas M, the ratio of heat capacities of the inlet gas γ, the inlet gas pressure P, and the inlet gas temperature T. F(s) is the valve dynamic transfer function which is independent of these operation conditions.

In general, the feed back controller K(s) 104 can be defined as:

$$K(s) = k \cdot G(s) \quad (2)$$

wherein k is the controller gain, and G(s) the controller dynamic transfer function which is independent of the operation conditions.

The closed loop transfer function of the feedback system, CL(s), is:

$$CL(s) = \frac{Q(s)}{Q_{sp}(s)} \quad (3)$$
$$= \frac{K(s) \cdot V(s)}{1 + K(s) \cdot V(s)}$$
$$= \frac{k \cdot k_v(M, \gamma, T, P) \cdot F(s) \cdot G(s)}{1 + k \cdot k_v(M, \gamma, T, P) \cdot F(s) \cdot G(s)}$$

The closed loop transfer function CL(s) determines the control performance of the feedback control system. If the closed loop transfer function is constant, even if operation conditions change, the control performance of the feedback control system remains the same. In order to have a constant closed loop transfer function CL(s) at different operation conditions, the controller K(s) must adjust itself based on the operation condition such that the net effect on CL(s) is constant. Therefore, a controller gain scheduling method for MFCs is needed in order to have a consistent control performance at different operation conditions.

In accordance with present disclosure, the gain scheduling for the controller gain, k, is determined by the ratio of calibration gas parameters to the operating gas parameters as follows:

$$k = \frac{k_{cal} \cdot k_v(M_{cal}, \gamma_{cal}, T_{cal}, P_{cal})}{k_v(M, \gamma, T, P)} \quad (4)$$

wherein $k_{cal}$ is the best controller gain determined in the calibration condition. The calibration gas parameters are the molecular weight of the calibration gas $M_{cal}$, the ratio of heat capacities of the calibration gas $\gamma_{cal}$, the calibration gas temperature $T_{cal}$, the calibration gas pressure $P_{cal}$. The operating gas parameters are the molecular weight of the inlet gas M, the ratio of heat capacities of the inlet gas γ, the inlet gas temperature T, and the inlet gas pressure P.

For the controller gain scheduling method of Eq. (4), the closed loop transfer function CL(s) remains constant at different operation conditions (e.g., different M, γ, T, P), which can be proved as follows:

$$CL(s) = \frac{K(s) \cdot V(s)}{1 + K(s) \cdot V(s)} \quad (5)$$

$$= \frac{k_v(M, \gamma, P, T) \cdot k \cdot F(s) \cdot G(s)}{1 + k_v(M, \gamma, P, T) \cdot k \cdot F(s) \cdot G(s)}$$

$$= \frac{k_v(M, \gamma, P, T) \cdot \frac{k_{cal} \cdot k_v(M_{cal}, \gamma_{cal}, P_{cal}, T_{cal})}{k_v(M, \gamma, P, T)} \cdot F(s) \cdot G(s)}{1 + k_v(M, \gamma, P, T) \cdot \frac{k_{cal} \cdot k_v(M_{cal}, \gamma_{cal}, P_{cal}, T_{cal})}{k_v(M, \gamma, P, T)} \cdot F(s) \cdot G(s)}$$

$$= \frac{k_{cal} \cdot k_v(M_{cal}, \gamma_{cal}, P_{cal}, T_{cal}) \cdot F(s) \cdot G(s)}{1 + k_{cal} \cdot k_v(M_{cal}, \gamma_{cal}, P_{cal}, T_{cal}) \cdot F(s) \cdot G(s)}$$

As one can see from the above equation, the closed loop transfer function CL(s) is indeed independent of the operation conditions such as the molecular weight of the inlet operating gas M, the ratio of heat capacities of the inlet operating gas γ, the temperature of the inlet operating gas T, and the pressure of the inlet operating gas P because both F(s) and G(s) are independent on these operation conditions as discussed above.

The information about the molecular weight of the inlet gas M and the ratio of heat capacities for the inlet gas γ is stored in memory of a processor forming a part of the mass flow controller. When a mass flow controller is in the operation condition, the inlet gas information is retrieved, the inlet gas temperature is measured by a temperature sensor, and the inlet gas pressure is measured by a pressure transducer insider the mass flow controller. Then the mass flow controller updates the controller gain, k, in real time according to the controller gain scheduling method of Eq. (4). In this way, the closed loop transfer function, CL(s), remains constant as proved by Eq.(5). Therefore, the control performance in the operation condition is the same as the control performance in the calibration condition though these two conditions are different in most cases.

If the inlet gas temperature in the operation condition does not vary much from the calibration condition or the inlet gas temperature is not available due to lack of a temperature sensor in the mass flow controller, one can factor out the gas temperature effect in the controller gain scheduling as:

$$k = \frac{k_{cal} \cdot k_v(M_{cal}, \gamma_{cal}, P_{cal})}{k_v(M, \gamma, P)} \quad (6)$$

Similarly, if the inlet gas pressure in the operation condition does not vary much from the calibration condition or the inlet gas pressure is not available due to lack of a pressure transducer in the mass flow controller, one can factor out the gas pressure effect in the controller gain scheduling as:

$$k = \frac{k_{cal} \cdot k_v(M_{cal}, \gamma_{cal}, T_{cal})}{k_v(M, \gamma, T)} \quad (7)$$

If both the inlet gas temperature and the inlet gas pressure in the operation condition does not vary much from the calibration condition or they are not available due to lack of measurement sensors in the mass flow controller, one can factor out their effects in the controller gain scheduling as:

$$k = \frac{k_{cal} \cdot k_v(M_{cal}, \gamma_{cal})}{k_v(M, \gamma)} \quad (8)$$

One can also factor out the gas type effects, i.e. M and γ, in Eq.(7) if they is not available or the gas in the operation condition is same as the one in the calibration condition.

Figure 1:
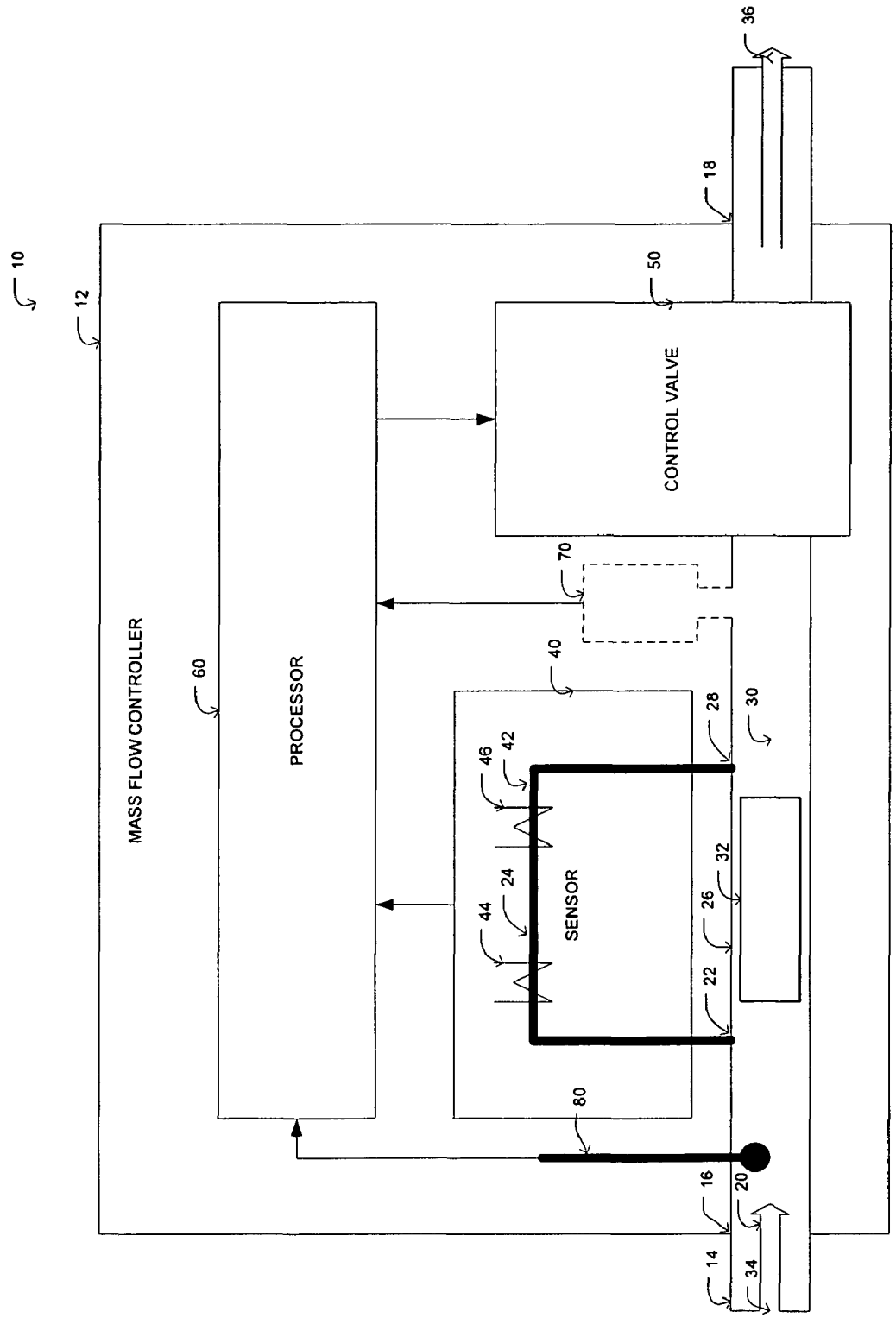
FIG. 1 is a block diagram of a thermal-based MFC.

It is noted that the foregoing analysis will work whether the control valve is a normally closed valve or a normally open valve. Further, while FIG. 1 has been described with respect to thermal-based MFCs, the controller gain scheduling approach will work for other types of MFCs such as pressure-based MFCs. Finally, it should be evident that the controller updates the feedback controller gain in real time based on the ratio of calibration gas parameters to the operating gas parameters of one or more of the following: the molecular weight of the inlet gas; the ratio of heat capacities of the inlet gas; the inlet gas temperature; and the inlet gas pressure; such that the closed loop transfer function of the feedback system remains substantially constant regardless of operating conditions so as to have a consistent control performance at different operation conditions from the calibration condition.

The control performance of using the controller gain scheduling is independent of operating conditions in that there is no need to build a set of predetermined flow rates for different operating conditions, correlating those flow rates to valve displacement measurements, and interpolating from that predetermined set. Different gain formula/equations are not substituted based on operating conditions. This approach derives the controller gain more accurately because it is not based on a series of linear data interpolations. Instead, the controller gain is directly calculated based on fluid parameters, not pre-determined operating conditions, which greatly improve the control performance in different operating conditions.

Figure 2B:
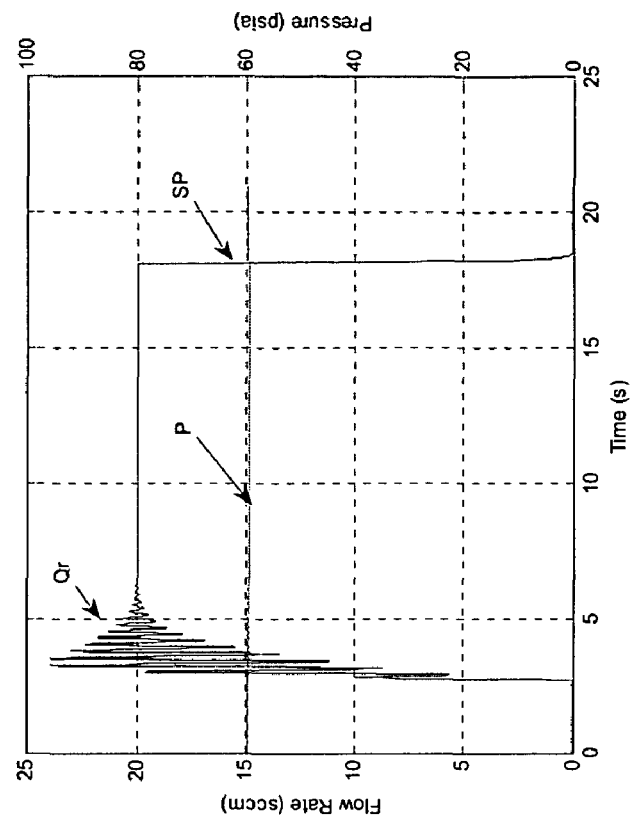
FIG. 2 is a graph showing undesirable control responses of prior art MFCs in a operation condition different from the calibration condition.
Figure 2A:
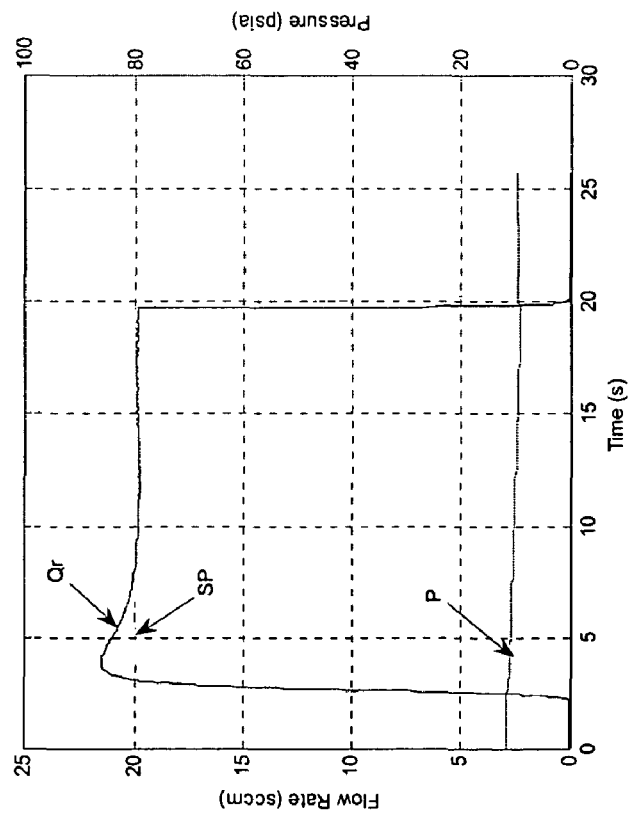
Figure 4B:
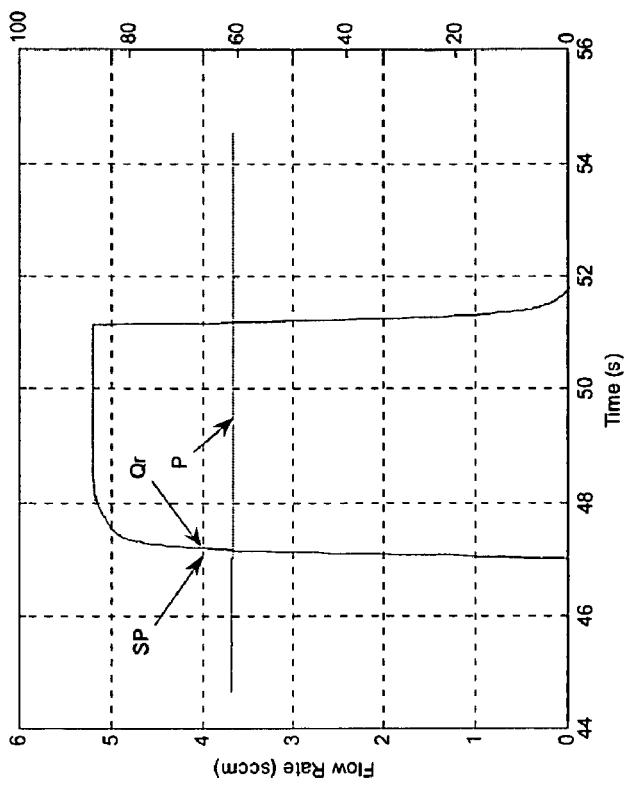
FIG. 4 is a graph showing substantial control performance improvement using the controller gain scheduling method in a operation condition different from the calibration condition.
Figure 4A:
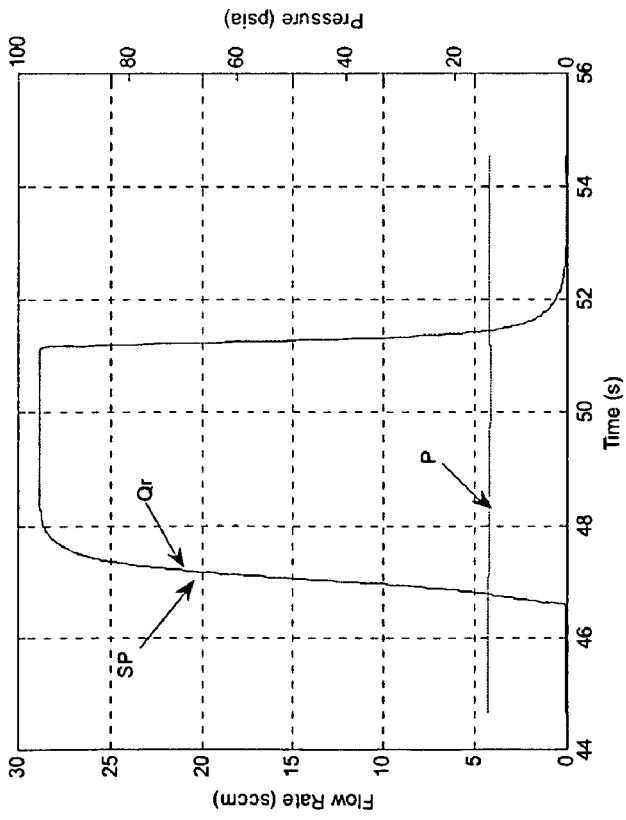

FIG. 4 illustrates examples of the control performance of using the controller gain scheduling for a πMFC, as a comparison to the one reference in FIG. 2. In both graphs of FIG. 4, time is represented on the X-axis in terms of seconds. For the fluid output ($Q_r$) and the set point (SP, the targeted value), the first Y-axis is used to denote flow rate expressed in terms of standard cubic centimeters per minute (sccm). For the fluid pressure (P), the second Y-axis is used to denote pressure in terms of pounds per square inch absolute (psia). As in FIG. 2, in πMFC operation, the πMFC tries to match the fluid flow output with the set point. As can be seen from FIG. 4A of a light-weight gas (fluid) and FIG. 4B of a heavy-weight gas (fluid) flowing through a πMFC, the controller gain scheduling approach has substantially eliminated any overshoot and oscillation problems.

Having described embodiments of the invention in detail, various modification and improvements will readily occur to those skilled in the art. Such modification and improvements are intended to be within the scope of the invention. Accordingly, the foregoing description is by way of example only, and is not intended as limiting. The invention is limited only as defined by the following claims and the equivalents thereto.

What is claimed is:

1. A mass flow controller having a feedback control gain, comprising:

a sensor configured so as to sense the flow of fluid through the controller;

a valve arranged so as to adjust the flow of fluid through the controller; and a processor configured so as to control the valve as a function of the flow of fluid sensed by the sensor;

wherein the sensor and valve are arranged within a feedback system, and the processor intermittently updates the feedback controller gain in real time based on the ratio of at least one calibration gas parameter to at least one operating gas parameter such that the closed loop transfer function of the feedback system remains substantially constant regardless of operating conditions so as to have a consistent control performance at different operating conditions from the calibration condition;

wherein the at least one calibration gas parameter and the at least one operating gas parameter comprise (i) the molecular weight of the inlet gas M, (ii) the ratio of heat capacities of the inlet gas γ, (iii) the temperature of the inlet gas T, and (iv) the pressure of the inlet gas P, and excluding (v) valve displacement;

a temperature sensor for sensing the inlet gas temperature T; and a pressure sensor for sensing the inlet gas pressure P, wherein the controller updates the controller gain k in real time as a function of the following:

$$k = \frac{k_{cal} \cdot k_v(M_{cal}, \gamma_{cal}, P_{cal})}{k_v(M, \gamma, P)}$$

wherein $k_{cal}$ is the controller gain determined in the calibration condition, $M_{cal}$ the molecular weight of calibration gas, $\gamma_{cal}$ the ratio of heat capacities of the calibration gas, $T_{cal}$ the temperature of the calibration gas, $P_{cal}$ the pressure of the calibration gas, and $k_v(\ )$ the valve gain function which is dependent on the operation conditions including the molecular weight of the inlet gas M, the ratio of heat capacities of the inlet gas γ, the temperature of the inlet gas T, and the pressure of the inlet gas P.

2. A mass flow controller according to claim 1, wherein the valve is normally closed.

3. A mass flow controller according to claim 1, wherein the valve is normally opened.

* * * * *